United States Patent [19]

Cattani

[11] Patent Number: 4,802,646
[45] Date of Patent: Feb. 7, 1989

[54] CLAMP FITTING, IN PARTICULAR FOR PIPES AND TUBE

[75] Inventor: Augusto Cattani, Parma, Italy

[73] Assignee: Officine Augusto Cattani & C. S.p.A., Italy

[21] Appl. No.: 136,289

[22] Filed: Dec. 22, 1987

[30] Foreign Application Priority Data

Jan. 30, 1987 [IT] Italy .............. 28903/87[U]

[51] Int. Cl.⁴ .................................................. F16L 3/08
[52] U.S. Cl. .................... 248/316.5; 248/74.2; 24/20 CW
[58] Field of Search ............ 24/16 R, 16 PB, 20 CW, 24/20 EE; 248/316.5, 316.7, 74.2, 74.3, 74.4, 74.5

[56] References Cited

U.S. PATENT DOCUMENTS

| | | | |
|---|---|---|---|
| 3,229,998 | 1/1966 | Pennington | 24/16 R |
| 3,670,369 | 6/1972 | McIlroy, II | |
| 4,240,604 | 12/1980 | Brach | 248/316.5 |
| 4,299,012 | 11/1981 | Oetiker | 24/20 CW |
| 4,624,432 | 11/1986 | Salacuse | 248/316.5 |
| 4,653,716 | 3/1987 | Sakaguchi | 248/74.5 |

FOREIGN PATENT DOCUMENTS

3034546A1  4/1981  Fed. Rep. of Germany .

Primary Examiner—Victor N. Sakran
Attorney, Agent, or Firm—Darby & Darby

[57] ABSTRACT

The fitting, which serves for rigid and flexible tube alike, comprises a base (1) to which two arched ribbon elements (4, 5) are hinged in a face-to-face arrangement via intermediate points along their relative external surface; the two elements (4, 5) are fastened together around the tube by causing an inward-facing lip (12), located at the end of one element (4), to engage one of a set of teeth (9) spaced apart at a given distance one from the next along the outer surface of the other element (5). The element (4) with the lip incorporates a lower section (8) shaped so as to breast, at least in part, with the cylindrical external surface of the clamped pipe or tube.

6 Claims, 1 Drawing Sheet

CLAMP FITTING, IN PARTICULAR FOR PIPES AND TUBE

BACKGROUND of the INVENTION

The invention disclosed relates to a clamp fitting, in particular for pipes or tube.

Such a fitting is suitable both for pipes and for rigid and flexible types of tube.

The main object of the invention is to permit of anchoring a rigid or flexible pipe or tube swiftly, without using up valuable time in tightening screws or other fasteners, and more importantly, to afford a secure anchorage even for tube of non-uniform external diameter.

A further object of the invention is to provide the facility of clamping different diameters of pipe or tube with equal efficiency.

The prior art embraces clamps and clips for pipe and tube comprising a base, and two arched elements hinged flexibly to the base at intermediate points along their relative external surfaces, which are dispose face to face and can be fastened one to the other at one end in a fixed position, thus creating a cylindrical cradle of given diameter in which to accommodate a pipe or tube.

One of the drawbacks of conventional fittings as described above is that they will accommodate one diameter of pipe or tube only, and must therefore be manufactured in as many sizes as there are different diameters of pipe or tube to be installed.

What is more, if the pipe or tube does not urge with sufficient force against the arched elements, the fitting will tend to work loose and open.

SUMMARY of the INVENTION

The stated objects and drawbacks are achieved and overcome by adoption of a clamp fitting for pipes and tube according to the invention.

Such a fitting comprises a base, and two arched ribbon elements, hinged to the base at intermediate points along their relative external surfaces and disposed face to face substantially within a common plane normal to the axis of the pipe or tube.

The two elements are fastened together, to the end of gripping the pipe or tube, through positive engagement of at least one inward-facing lip located at the end of one element, with one of a plurality of teeth spaced apart at a given distance one from the next along the outer surface of the remaining element, departing from its top end.

One element exhibits a lower section affording an internal cylindrical profile breasted at least in part with the external cylindrical surface of the clamped pipe or tube, and an upper section, which terminates in the inward-facing lip and is offset outwards from the would-be continuation of the cylindrical profile of the lower section so as to create a space for accommodation of the upper section of the remaining element.

The inside surface of the remaining element, on the other hand, presents an entirely cylindrical profile breasted at least in part with the external cylindrical surface of the clamped pipe or tube.

BRIEF DESCRIPTION OF THE DRAWINGS

The invention will now be described in detail, by way of example, with the aid of the accompanying drawings, in which.

DESCRIPTION of the PREFERRED EMBODIMENT

Figure 1:
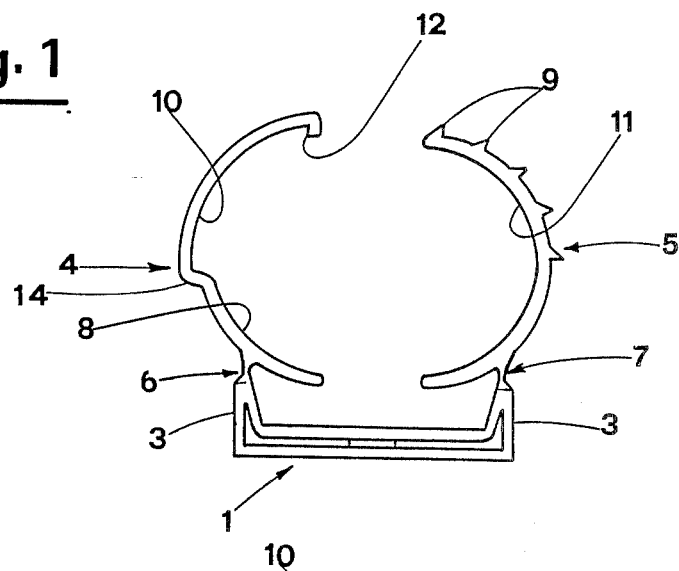
FIG. 1 is a schematic representation of the fitting disclosed, viewed in the open position.

With reference to the drawings, 1 denotes the base of a clamp fitting for pipes or tube, provided with a hole 2 at centre for fixing purposes, and with two identical lugs 3, one at either side.

4 and 5 denote two arched ribbon elements, hingedly attached to the projecting tips of the two lugs 3 at intermediate points along their relative external surfaces, and disposed face to face. The base 1 and the two arched elements 4 and 5 are fashioned in one piece from plastic material. The two hinges 6 and 7 connecting the tips of the lugs 3 and the relative arched elements 4 and 5 are embodied as thin webs, which are therefore flexible and permit of rotating the elements 4 and 5 in one direction and the other, relative to the base.

The element denoted 4 exhibits a lower section 8 affording an inside surface of cylindrical profile, designed to breast with the external cylindrical surface of the clamped pipe or tube, and an upper section 10 that is offset outward from the would-be continuation of the cylindrical profile of the lower section 8 and terminates in an inward-facing lip 12. As the thickness of this element 4 is substantially constant throughout, the outward offset is obtained by way of a bend 14.

The arched element denoted 5 exhibits a plurality of teeth 9 set apart at a given distance one from the next along its external surface, departing from the top end as seen in the drawings. The inside surface of this element 5 presents an entirely cylindrical profile 11 designed to breast with the cylindrical external surface of the pipe or tube gripped between the two elements.

Figure 2:
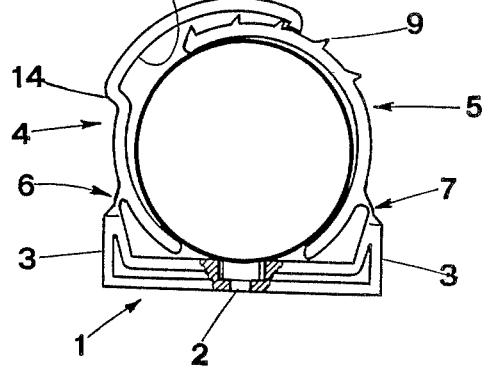
FIGS. 2 and 3 are further views of the fitting from the same standpoint as that of FIG. 1, showing two closed positions assumed in gripping two pipes or tubes of dissimilar diameter.
Figure 3:
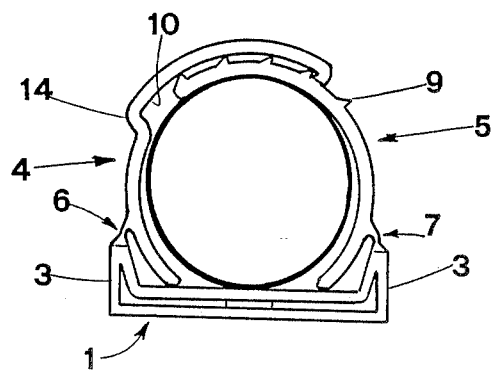

The capability of the two arched elements 4 and 5 to fasten together and clamp tubes of different diameter is due to their geometry. By offsetting the upper section 10 of the one element 4 from the would-be continuation of the cylindrical profile of its lower section 8, a space is created in which to accommodate the top end of the remaining element 5 (as in FIGS. 2 and 3). More exactly, the fastening capability aforementioned is ensured by virtue of the fact that the upper and lower sections 10 and 8 of the element 4 with the bend 14 are embodied as circumferential arcs the subtending chords of which lie substantially at right angles to one another.

The geometry of a clamp fitting according to the invention ensures that contact with the external surface of the pipe or tube will occur exclusively by way of the internal cylindrical surface 11 of the one element 5, and the internal cylindrical surface of the lower section 8 of the other element 4.

In a normal embodiment, the internal cylindrical surface of the two elements will be disposed such that a pipe or tube clamped between them also makes contact with the surface offered by the central area of the base 1.

The clamp fitting is fastened around the pipe or tube quite simply by urging the two elements 4 and 5 from either side one against the other and exerting pressure to the point where the lip 12 engages with one of the teeth 9. The flanks of the lip 12 and the teeth 9 will be disposed in such a way as to render the clamping action secure, with no possibility of the lip 12 separating from the tooth 10 as a result of a force being applied that would tend to open the fitting, i.e. tending to distance the elements 4 and 5 one from the other.

Moreover, the geometry of the arched elements and the spring action of the hinges 6 and 7 combine to ensure that, in a typical closed configuration of the fitting, the end of the top part 10 of the element 4 with the lip 12 remains tucked closely against the top part of the element 5 incorporating the teeth 9.

What is claimed:

1. A clamp arrangement comprising
a clamp having a base with a substantially flat inside surface,
two support elements extending upwardly from said base, first and second engaging elements each having a body with an arc-shaped configuration, each said engaging element having fastening means at a first end thereof for fastening said engaging elements together,
a second end of each said engaging element is free,
each said engaging element is pivotally attached to one said support element at a point between said first and second ends,
when an element to be clamped is inserted into the clamping arrangement said first and second engaging elements are pivotally moved about said support elements so that said free second ends of the first and second engaging elements support the element to be clamped from underneath to ensure smooth movement of the element within the clamp, whereby in the locked condition said free second ends of the first and second engaging elements engage the substantially flat inside surface of the base in such a manner that substantial gaps are defined between said free second ends and the element to be clamped, and said element to be clamped is received by the arc-shaped engaging elements and the substantially flat surface of the base.

2. A clamp arrangement according to claim 1 wherein said element to be clamped has substantially cylindrical configuration.

3. A clamp arrangement according to claim 2 wherein in the locked condition of the arrangement said engaging elements are fastened to each other by said fastening means.

4. A clamp arrangement according to claim 2 wherein
said first end of the first engaging element having an engaging lip which offsets outwardly from the body of the first engaging element to create a space to accommodate the first end of the second element, the first end of the second element having a plurality of spaced apart teeth,
whereby in the locked condition of the arrangement said engaging lip engages said spaced apart teeth to keep the element to be clamped within the clamp.

5. A clamp arrangement comprising
a base having a substantially flat inside surface,
two support elements extending upwardly from said base, first and second engaging element each having an arc-shaped configuration,
each said engaging element having fastening means at a first end thereof for fastening said engaging elements together,
a second end of each said engaging element is free,
each said engaging element is pivotally attached to one said support element at a point between said first and second ends,
whereby in a closed condition of said clamping arrangement when said engaging elements are fastened to each other by said fastening means said free ends of the first and second engaging elements engage with the substantially flat inside surface of the base and whereby a receiving area is defined by said arc-shaped engaging elements and the substantially flat surface of the base.

6. A clamp arrangement according to claim 5 wherein said first and second engaging elements each pivotally attached to said support elements at a point on an outside surface thereof.

* * * * *